US008488535B2

(12) United States Patent
Che

(10) Patent No.: US 8,488,535 B2
(45) Date of Patent: Jul. 16, 2013

(54) APPARATUS AND METHOD TO ALLOCATE COMMUNICATION RESOURCES FOR AN APERIODIC DATA PACKET IN A COMMUNICATION SYSTEM

(75) Inventor: Xiang Guang Che, Beijing (CN)

(73) Assignee: Nokia Corporation, Espoo (FI)

( * ) Notice: Subject to any disclaimer, the term of this patent is extended or adjusted under 35 U.S.C. 154(b) by 602 days.

(21) Appl. No.: 12/612,255

(22) Filed: Nov. 4, 2009

(65) Prior Publication Data

US 2010/0150114 A1    Jun. 17, 2010

Related U.S. Application Data

(60) Provisional application No. 61/111,192, filed on Nov. 4, 2008.

(51) Int. Cl.
*H04W 4/00* (2009.01)
(52) U.S. Cl.
USPC .......................................... 370/329; 370/336
(58) Field of Classification Search
USPC .................................. 370/336, 329
See application file for complete search history.

(56) References Cited

U.S. PATENT DOCUMENTS

| | | | |
|---|---|---|---|
| 6,996,131 B1 | 2/2006 | Islam et al. ................... | 370/514 |
| 2008/0305745 A1* | 12/2008 | Zhang et al. ............... | 455/67.11 |
| 2009/0238121 A1* | 9/2009 | Kotecha ........................ | 370/329 |
| 2010/0027456 A1* | 2/2010 | Onggosanusi et al. ....... | 370/312 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.5.0, May 2008, 134 pgs.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V1.0.0, Mar. 2007, 82 pgs.
"3rd Generation Partnership Project; Technical Specification Group Radio Access Network; Evolved Universal Terrestrial Radio Access (E-UTRA); Physical Channels and Modulation (Release 8)", 3GPP TS 36.211 V8.4.0, Sep. 2008, 80 pgs.
"3rd Generation Partnership Project; Technical Specification Group Radio Access Network; Evolved Universal Terrestrial Radio Access (E-UTRA); Physical layer procedures (Release 8)", 3GPP TS 36.212 V8.4.0, Sep. 2008, 60 pgs.
"3rd Generation Partnership Project; Technical Specification Group Radio Access Network; Evolved Universal Terrestrial Radio Access (E-UTRA); Multiplexing and channel coding (Release 8)", 3GPP TS 36.212 V8.4.0, Sep. 2008, 56 pgs.

* cited by examiner

*Primary Examiner* — Sai-Ming Chan
(74) *Attorney, Agent, or Firm* — Harrington & Smith

(57) ABSTRACT

Apparatus and methods for allocating communication resources for an aperiodic data packet in a communication system. A transmission time interval for an aperiodic data packet including a channel quality indicator report is allocated during at least one of a first transmission time interval and a second transmission time interval in an uplink scheduling window in accordance with an uplink scheduling grant by a network entity, and a message is assembled including said aperiodic data packet for transmission to said network entity during said at least one of said first transmission time interval and said second transmission time interval.

15 Claims, 4 Drawing Sheets

| CONFIGURATION | SWITCH-POINT PERIODICITY | SUBFRAME NUMBER ||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

US 8,488,535 B2

APPARATUS AND METHOD TO ALLOCATE COMMUNICATION RESOURCES FOR AN APERIODIC DATA PACKET IN A COMMUNICATION SYSTEM

CROSS REFERENCE TO RELATED APPLICATION

This application claims the benefit of U.S. Provisional Application No. 61/111,192 entitled "APPARATUS AND METHOD TO ALLOCATE COMMUNICATION RESOURCES FOR AN APERIODIC DATA PACKET IN A COMMUNICATION SYSTEM" filed on Nov. 4, 2008, which is incorporated herein by reference.

TECHNICAL FIELD

The present invention is directed, in general, to communication systems and, in particular, to system and method for providing communication resources for an aperiodic data packet including a channel quality information report from a wireless communication device in a communication system.

BACKGROUND

Long term evolution ("LTE"), also referred to as "3G," refers to research and development involving the third generation partnership project ("3GPP"), which is the name generally used to describe an ongoing effort across the industry aimed at identifying technologies and capabilities that can improve systems such as the universal mobile telecommunication system ("UMTS"). The goals of this broadly based project include improving communication efficiency, lowering costs, improving services, making use of new spectrum opportunities, and achieving better integration with other open standards. The 3GPP LTE project is not itself a standard-generating effort, but will result in new recommendations for standards for the UMTS.

The evolved universal terrestrial radio access network ("E-UTRAN") in 3GPP includes base stations providing user plane (including packet data convergence protocol/radio link control/medium access control/physical ("PDCP/RLC/MAC/PHY") sublayers) and control plane (including a radio resource control ("RRC") sublayer) protocol terminations towards communication devices such as cellular telephones. A wireless communication device is generally known as user equipment ("UE"), a mobile station, or a mobile terminal. A base station is an entity of a communication network often referred to as a Node B or an NB. Particularly in the E-UTRAN, an "evolved" base station is referred to as an eNodeB. For details about the overall architecture of the E-UTRAN, see 3GPP Technical Specification 3GPP TS 36.300, v.1.0.0 (2007-03), which is incorporated herein by reference. As wireless communication systems such as cellular telephone, satellite, and microwave communication systems become widely deployed and continue to attract a growing number of users, there is a pressing need to accommodate a large and variable number of communication devices transmitting a growing range of communication applications with fixed resources.

The wireless communication systems as described herein are applicable to, for instance, 3GPP LTE compatible wireless communication systems and, of interest, is an aspect of LTE referred to as "evolved UMTS Terrestrial Radio Access Network," or E-UTRAN. In general, E-UTRAN resources are assigned more or less temporarily by the network to one or more user equipment by use of allocation tables, or more generally by use of a downlink resource assignment channel or physical downlink control channel ("PDCCH"). The LTE is a packet-based system and, therefore, there may not be a dedicated connection reserved for communication between the user equipment and the network. Users are generally scheduled on a shared channel during transmission time intervals ("TTIs") by a base station. A base station controls communications between user equipment in a cell served by the base station. In general, one base station serves each cell. The LTE generally supports a large number of user equipment per cell with quasi-instantaneous access in an active state to radio resources. It is a design requirement that at least 200 users per cell should be supported in the active state for spectrum allocations up to five megahertz ("MHz"), and at least 400 users for a higher spectrum allocation.

In order to facilitate scheduling on the shared channel, the base station transmits a resource allocation to particular user equipment on a physical downlink control channel ("PDCCH"). The allocation information may be related to an uplink ("UL") and downlink ("DL") channels, or both. The allocation information may include information about which resource blocks in the frequency domain or time domain, or both, are allocated to the scheduled user equipment, the modulation and coding scheme ("MCS") to use, the size of the transport block, and the like. The lowest level of communication in the E-UTRAN system, Level 1, is implemented by the physical layer ("PHY") in the user equipment and in the base station, and the physical layer performs the physical transport of the packets therebetween over the air interface using radio frequency signals.

In the current 3GPP specification employing, for instance, a frequency division duplex ("FDD") and time division duplex ("TDD") communication modes, when a resource grant for an uplink allocates only a single uplink time transmission time interval, there is no ambiguity for the user equipment to know in which uplink time transmission time interval to multiplex a requested response, such as an aperiodically requested channel quality indicator ("CQI") report, because only one uplink time transmission time interval is specified. However, if two or more uplink time transmission time intervals are allocated to the user equipment by a single resource grant, it is unclear for the user equipment on which uplink time transmission time interval to multiplex the requested response, such as the requested aperiodic CQI report. For example, for the asymmetric 3GPP downlink/uplink TDD pattern "configuration 0" (i.e., the TDD pattern wherein two downlink and three uplink time transmission time intervals are transmitted per five millisecond ("ms") half radio frame), a multi transmission time interval allocation uplink grant allocating two uplink time transmission time intervals is sent to the user equipment. This resource grant of multiple transmission time intervals introduces an ambiguity in the response by the user equipment in which uplink time transmission time interval(s) to multiplex a requested response.

Thus, in view of the growing deployment of communication systems such as cellular communication systems, further improvements for user equipment packet scheduling for a requested response in an uplink would be advantageous to provide efficient and unambiguous allocation of communication resources. Therefore, what is needed in the art is a system and method that avoid the deficiencies of communication devices employing conventional resource allocation subsystems for an aperiodically requested response from a communication device such as user equipment.

SUMMARY OF THE INVENTION

These and other problems are generally solved or circumvented, and technical advantages are generally achieved, by embodiments of the present invention, which include a method, apparatus, and system to provide communication resources for an aperiodic data packet in a communication system. In one embodiment, the apparatus (e.g., a controller of a wireless communication device) includes a communication resource allocator configured to allocate a transmission time interval for transmission of the aperiodic data packet (e.g., with a channel quality indicator report) during one of a first transmission time interval, a second transmission time interval, and both the first and second transmission time intervals in an uplink scheduling window in response to a request for the aperiodic data packet by a network entity (e.g., a base station) and allocation of a plurality of uplink transmission time intervals in the scheduling window associated with the request by the network entity. The apparatus also includes a message generator coupled to the communication resource allocator configured to assemble a message including the aperiodic data packet for transmission to the network entity during the one of the first transmission time interval, the second transmission time interval, and both the first and second transmission time intervals.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of a system and method for allocating a communication resource in an uplink for user equipment to communicate requested data such as an aperiodic channel quality indicator report.

Figure 1:
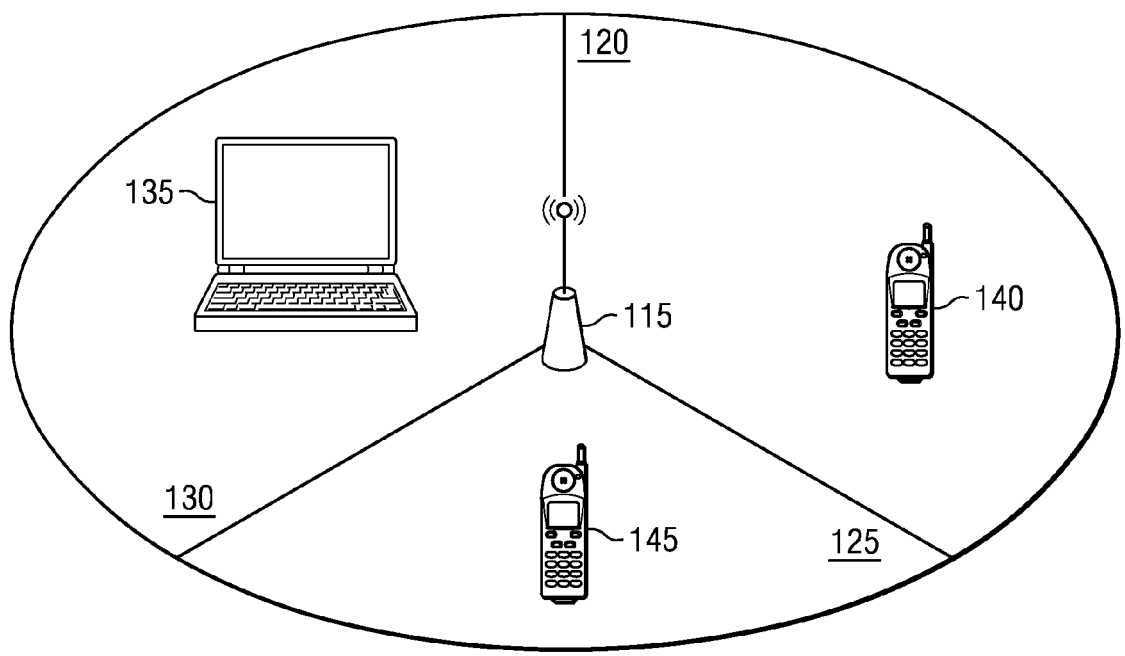
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., mobile stations) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. The sectors are formed by focusing and phasing the radiated and received signals from the base station antennas. The plurality of sectors increases the number of subscriber stations (e.g., the wireless communication devices 135, 140, 145) that can simultaneously communicate with the base station 115 without the need to increase the utilized bandwidth by reduction of interference that results from focusing and phasing base station antennas. The radiated and received frequencies utilized by the communication system illustrated in FIG. 1 would typically be two gigahertz to provide non-line-of-sight communication.

Figure 2:
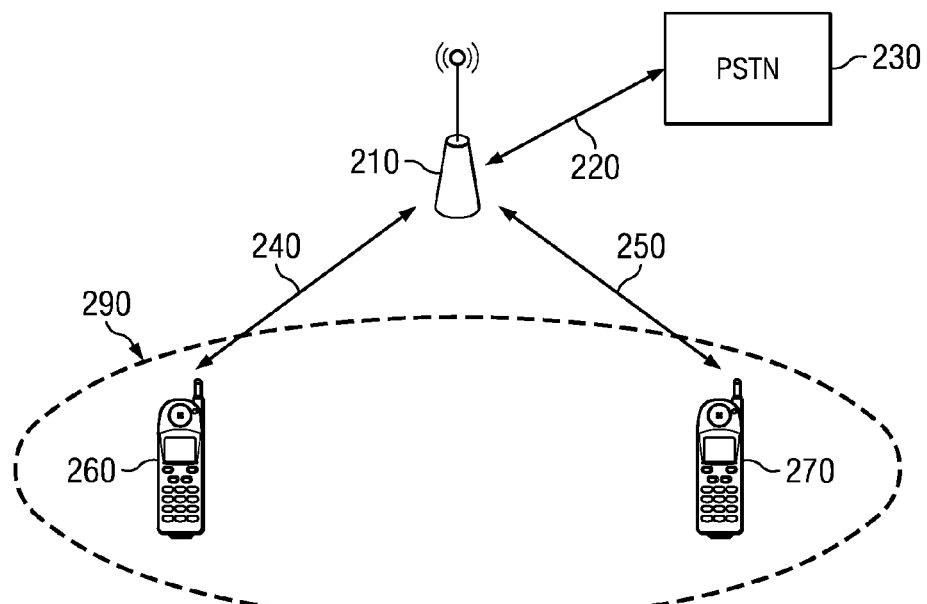

Turning now to FIG. 2, illustrated is a system level diagram of an embodiment of a communication system including a base station and wireless communication devices that provides an environment for application of the principles of the present invention. The communication system includes a base station 210 coupled by communication path or link 220 (e.g., by a fiber-optic communication path) to a core telecommunications network such as public switched telephone network ("PSTN") 230. The base station 210 is coupled by wireless communication paths or links 240, 250 to wireless communication devices 260, 270, respectively, that lie within its cellular communication area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in FDD and/or TDD communication modes. The 3GPP Technical Specification 3GPP TS 36.300, v.8.5.0 (2008-05) and 3GPP TS 36.211, v.8.4.0 (2008-09), which are incorporated herein by reference, available from the website www.3gpp.org, provides in part the specifications for the physical interfaces for the E-UTRAN networks.

Figure 3:
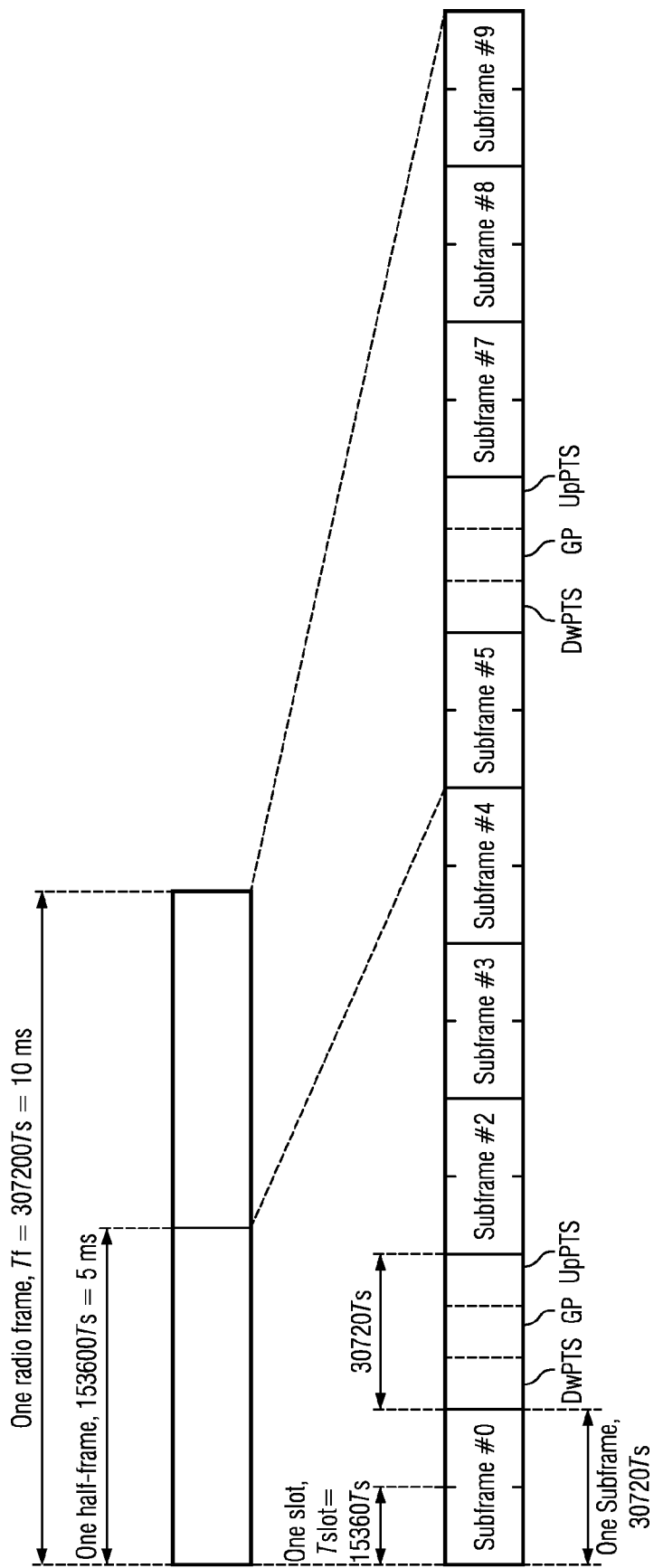
FIG. 3 illustrates a block diagram showing an exemplary type 2 transport radio frame used in an E-UTRAN system to communicate packets to and from, for example, a base station employing a time division duplex communication mode over an air interface in accordance with the principles of the present invention.

Turning now to FIG. 3, illustrated is a block diagram showing an exemplary type 2 transport radio frame used in an E-UTRAN system to communicate packets to and from, for example, a base station employing a time division duplex communication mode over an air interface in accordance with the principles of the present invention. The 3GPP TS 36.211 v.8.4.0 describes the TDD frame structure in more detail at pages 10-11 thereof. A radio frame in the communication system is presently defined as having a length of 10 milliseconds ("ms"). The radio frame is further subdivided into 10 subframes, each having a length of one millisecond. Each subframe is further divided again into two slots; each slot has a length of 0.5 milliseconds. The E-UTRAN TDD frame structure is further designed to have both five millisecond and 10 millisecond switch point periodicity. The subframes #1 and #6 in an E-UTRAN TDD frame structure with a switch-point periodicity of five milliseconds, or the subframe #1 in an E-UTRAN TDD frame structure with a switch-point periodicity of 10 milliseconds, are special subframes with three fields, namely, a downlink pilot time slot ("DwPTS"), a guard period ("GP") and an uplink pilot time slot ("UpPTS") as shown in FIG. 3. The TDD frame structure is the same length (10 milliseconds, which is 2 half frames, or 10 subframes, each having two slots) as a FDD frame structure, making a dual duplexing mode systems easier to implement.

Figures 4, 5A:
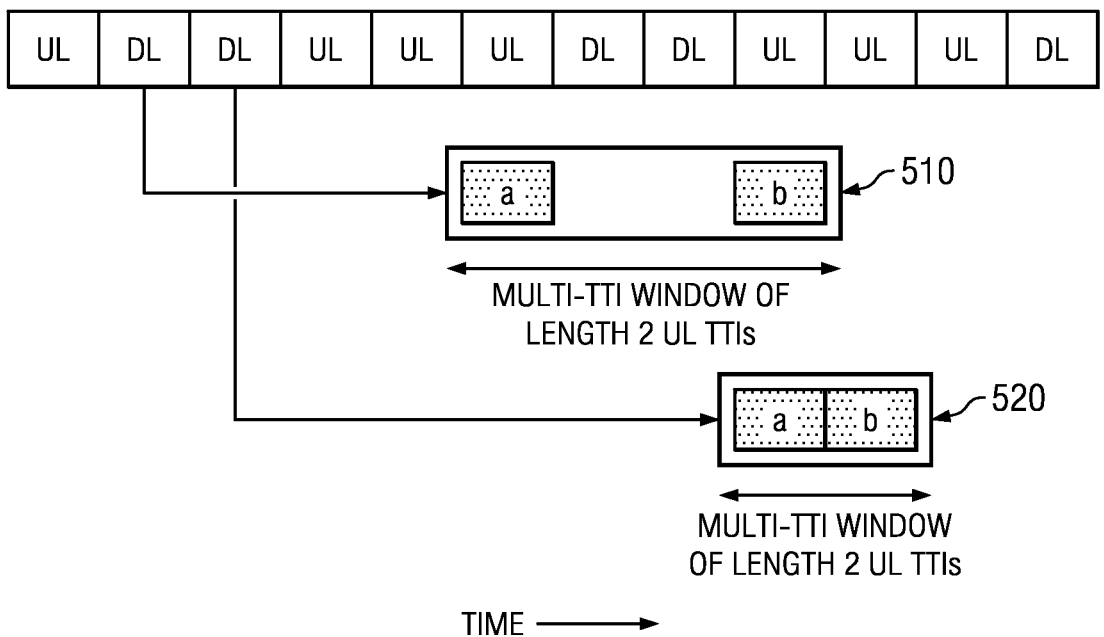
FIG. 4 illustrates a table listing exemplary time division duplex frame configurations available in E-UTRAN system for time division duplex radio frames in accordance with the principles of the present invention.
FIG. 5A illustrates a timing diagram showing an exemplary allocation of two uplink transmit time intervals in a scheduling window employing a single uplink scheduling grant in accordance with the principles of the present invention.

There are seven configurations defined for the TDD that determine which arrangement of downlink and uplink patterns are to be used. FIG. 4 illustrates a table listing exemplary time division duplex frame configurations available in E-UTRAN system for time division duplex radio frames in accordance with the principles of the present invention. More specifically, FIG. 4 illustrates the uplink "U," downlink "D" and special "S" time division duplex configuration patterns selectable by radio resource control ("RRC") and communicated to the user equipment by the base station so that the configuration pattern selected is known to both the user equipment and the base station. The configuration may be chosen to be any of the seven now defined in the specification. Further, the amount of downlink and uplink traffic subframes may be determined in part by the TDD configuration Nos. 0-6 that are selected.

An embodiment of the invention described herein is related to 3GPP LTE standardization and to Layer 1 procedures (i.e., Layer 1 procedures as described in 3GPP TS 36.213, v.8.4.0 (2008-09), which is incorporated herein by reference). More particularly, a new aperiodic channel quality indicator report request process is introduced herein for the TDD and FDD communication duplex mode of a 3GPP LTE communication system. Several processes are introduced to support a full and flexible yet simple aperiodic channel quality indicator report on a physical uplink shared channel ("PUSCH") in combination with uplink multi transmission time interval allocation by a base station.

In time division duplex uplink/downlink configuration 0 (i.e., two downlinks and three uplinks allocated per five millisecond half radio frame), the number of downlink subframes is less than that of uplink subframes, and a multi transmission time interval uplink allocation method is defined in the 3GPP Radio Access Network 1 ("RAN1") specification 3GPP TS 36.213 v.8.4.0 (2008-09) to support allocation of the uplink transmission time intervals. In particular, a two bit uplink transmission time interval index is included in the uplink grant to the user equipment from the base station. One such uplink grant can allocate either a first (e.g., an "early"), a second (e.g., a "late") or both early and late uplink transmission time intervals for a user equipment by setting a least significant bit ("LSB"), most significant bit ("MSB") or both of a two bit uplink transmission time interval index to binary value of "1". Hence, two uplink grants in two downlink subframes can allocate all or any of the three uplink transmission time interval with full flexibility. In the present 3GPP RAN1 specification 3GPP TS 36.212 v.8.4.0 (2008-09) and 3GPP TS 36.213 v.8.4.0 (2008-09), which are incorporated herein by reference, an aperiodic channel quality indicator report is supported by setting the "CQI request" bit by a base station in an uplink grant. Hence, the channel quality indicator report is multiplexed by the target user equipment in the next PUSCH transmission with its content predefined and preconfigured by higher layers.

For a multi-uplink transmission time interval allocation in the LTE TDD mode, such as a configuration 0 allocation, two subframes in a five millisecond half frame are allocated for the downlink (including the special subframe) and, simultaneously, three subframes are allocated for the uplink. The special case should be considered wherein there are more uplink resources than downlink resources. Thus, a particular issue for TDD resource allocation in 3GPP is that since a single uplink scheduling grant in the physical downlink control channel ("PDCCH") allocates up to two different uplink transmission time intervals, it would be advantageous to allocate both uplink transmission time intervals in the same uplink scheduling grant to save signaling overhead on the PDCCH. Multi-transmission time interval allocation is specified in 3GPP to allocate up to two uplink transmission time intervals in a single uplink scheduling grant.

Turning now to FIG. 5A, illustrated is a timing diagram showing an exemplary allocation of two uplink transmit time intervals in a scheduling window employing a single uplink scheduling grant in accordance with the principles of the present invention. In particular, the allocation of the two uplink transmit time intervals in a scheduling window employs a single uplink scheduling grant in a time instance on the PDCCH. As illustrated in FIG. 5A, an uplink scheduling grant transmitted in the first downlink subframe schedules two uplink transmission time intervals, "a" and "b," in a scheduling window, such as first and second scheduling windows 510, 520. The first transmission time interval "a" in the scheduling windows 510, 520 for a single uplink grant is referred to as an early transmission time interval, and the second transmission time interval "b" in the scheduling windows 510, 520 covered by the single uplink grant is referred to as a late transmission time interval. For each uplink grant, the scheduling window position (i.e., the particular uplink transmission time interval that is scheduled) may vary in the time domain depending on the time instance of the uplink grant sent in the PDCCH and the user equipment processing time between upon reception of an uplink grant and the time when user equipment is ready to transmit on the uplink transmission time interval. When only the first transmission time interval "a" or the second transmission time interval "b" is allocated for uplink transmission by a single uplink scheduling grant, there is no ambiguity on which uplink transmission interval that the user equipment shall multiplex the requested aperiodic data packet including the channel quality indicator report. When both the first and second transmission time intervals "a" and "b" are allocated by a single uplink scheduling grant, it is unclear for user equipment on which uplink transmission interval it shall multiplex the requested aperiodic data packet including the channel quality indicator report.

The current uplink signaling scheme employing a two-bit uplink transmission time interval index transmitted by a base station to support multi-transmission time interval allocation is shown in TABLE I below. As shown in TABLE I, one of the four states (i.e., the state provided by the binary bits "00") is undefined.

TABLE I

| | |
|---|---|
| 00 | Undefined |
| 01 | Transmit data in early TTI ("a") |
| 10 | Transmit data in late TTI ("b") |
| 11 | Transmit data in both early and late TTI ("a" and "b") |

Figure 5B:
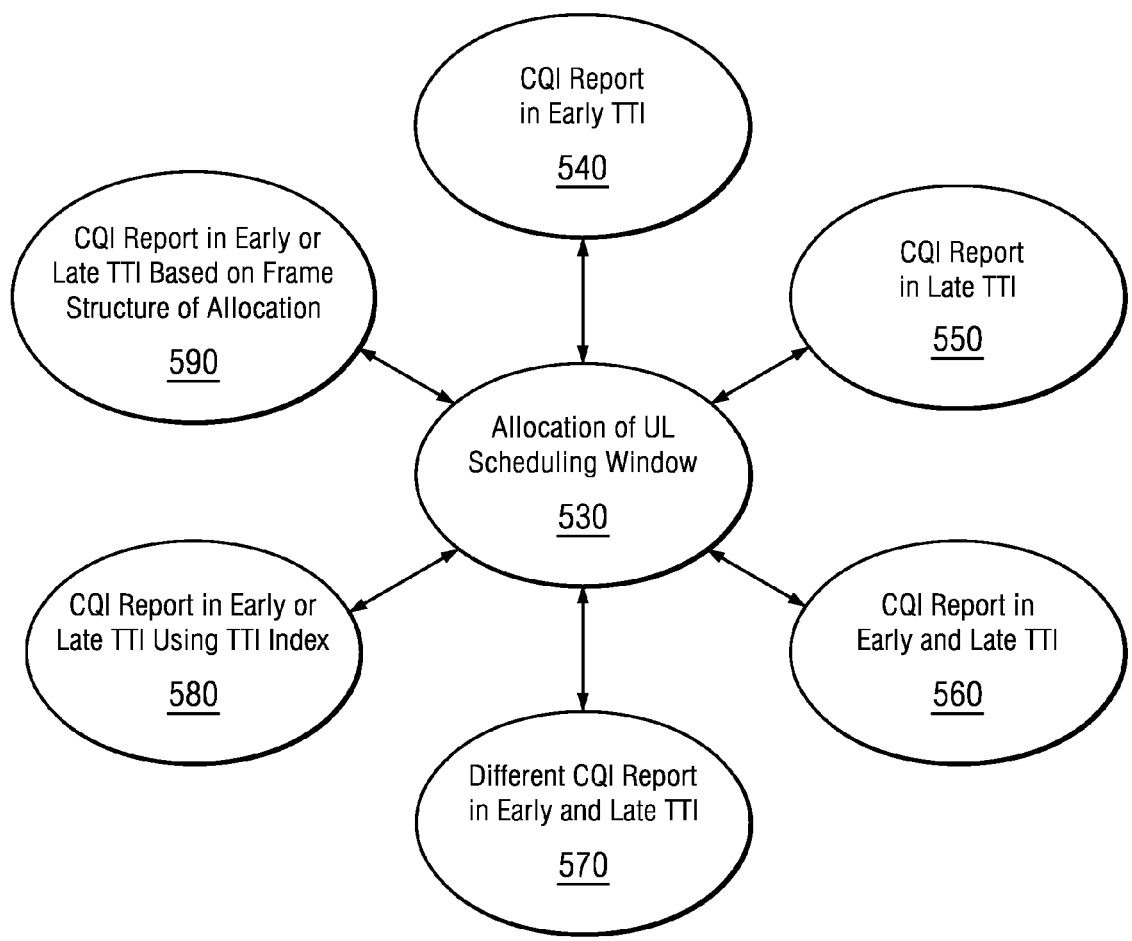
FIG. 5B illustrates a diagram of exemplary options for selecting a transmission time interval to transmit an aperiodic data packet in accordance with the principles of the present invention.

In general, several efficient options are provided to relieve the ambiguity for a communication device such as user equipment to select a transmission time interval to transmit an aperiodic data packet including a channel quality indicator report requested by a base station. One of these options as illustrated in FIG. 5B and with continuing reference to FIG. 5A, may be selected for a 3GPP LTE communication system design in response an allocation of an uplink scheduling window (designated 530 in FIG. 5B). According to a first option, an aperiodic data packet including a channel quality indicator report is transmitted on the early transmission time interval or subframe if the channel quality indicator measured from a most recent downlink subframe(s) satisfies the lower threshold processing time for the channel quality indicator report. The lower threshold processing time may be a known minimum time (e.g., 2-4 milliseconds) that the user equipment employs for measuring, post-processing, coding, modulating, generating, and preparing to transmit the channel quality indicator report in an uplink. Thus, a network entity such as a base station allocates an uplink scheduling window as illustrated in FIGS. 5A and 5B, without transmitting an uplink transmission time interval index, and the user equipment responds with a requested aperiodic data packet including the channel quality indicator report in the early transmission time interval (designated 540 in FIG. 5B).

For instance, given a reasonable base station processing time, the minimum time from when a channel quality indicator report is requested until it is sent in an uplink would allow an aperiodic channel quality indicator report to be available in the following five millisecond transmission time interval when using the first downlink subframe for the uplink grant. As illustrated in FIG. 5A, when the transmission time interval for the channel quality indicator report is allocated in the first downlink subframe, the "age" of the channel quality indicator report will be longer compared to if the channel quality indicator report was allocated in a later subframe (i.e., the channel quality indicator report is sent 10 milliseconds later than it was requested). When the transmission time interval for the channel quality indicator report is allocated using the PDCCH in the second downlink subframe, the choice of the early transmission time interval is preferable to both ensure a more recent channel quality indicator report and the first possible application of the channel quality indicator report to the base station when considering base station processing time.

According to a second option, the aperiodic data packet including the channel quality indicator report is transmitted on the late transmission time interval or subframe if the channel quality indicator measured from most recent downlink subframe(s) satisfies the lower threshold processing time for the channel quality indicator report. Again, the lower threshold processing time may be a known minimum time that the user equipment requires for measuring, post-proces sing, coding, modulating, generating, and preparing to transmit the channel quality indicator report in the uplink. Thus, a network entity such as a base station allocates an uplink scheduling window as illustrated in FIGS. 5A and 5B, without transmitting an uplink transmission time interval index, and the user equipment responds with a requested aperiodic data packet including the channel quality indicator report in the late transmission time interval (designated 550 in FIG. 5B).

Opposite to the first option mentioned above, if the transmission time interval for the channel quality indicator report is allocated in first downlink subframe, the user equipment will provide the channel quality indicator report 10 milliseconds later. This may be problematic when the user equipment is operating in a discontinuous reception ("DRX") communication mode and using an inactivity timer as the trigger. On the other hand, in the case when the transmission time interval for the channel quality indicator report is allocated in the first downlink subframe, the user equipment will provide a more recent channel quality indicator report. For allocations in the second downlink subframe, the placement of the channel quality indicator report in the late transmission time interval is less preferable as discussed under the first option above.

According to a third option, the aperiodic data packet including the channel quality indicator report is transmitted on both early and late transmission time intervals or subframes with the same channel quality indicator report content. The modulation coding scheme for each channel quality indicator report in one of the uplink transmission time intervals can be more aggressive, for example, a modulation constellation with a larger number of constellation points can be used to maintain or reduce the overall consumption of resources in the two uplink transmission time intervals for the channel quality indicator report. Thus, a network entity such as a base station allocates an uplink scheduling window as illustrated in FIGS. 5A and 5B, without transmitting an uplink transmission time interval index, and the user equipment responds with a requested aperiodic data packet including the channel quality indicator report in the early and late transmission time intervals (designated 560 in FIG. 5B).

According to a fourth option, the aperiodic data packet including the channel quality indicator report is transmitted on both the early and late transmission time intervals or subframes with different channel quality indicator report content. The different channel quality indicator reports can report channel quality information on different frequency bands or different sub-bands, or can report channel quality information at different measurement times. Thus, a network entity such as a base station allocates an uplink scheduling window as illustrated in FIGS. 5A and 5B, without transmitting an uplink transmission time interval index, and the user equipment responds with a requested aperiodic data packet including different channel quality indicator reports in the early and late transmission time intervals (designated 570 in FIG. 5B).

According to a fifth option, both the first and the second bits of an uplink transmission time interval index from the base station are used to select the early or the late transmission time intervals or subframes for the user equipment to transmit the aperiodic data packet including the channel quality indicator report (i.e., both the most significant bit ("MSB") and the least significant bit ("LSB") of a two bit uplink transmission time interval index are set to "1" or to "0". Thus, a network entity such as a base station allocates an uplink scheduling window as illustrated in FIGS. 5A and 5B, with an uplink transmission time interval index, and the user equipment responds with a requested aperiodic data packet including a channel quality indicator report in the early and the late transmission time interval, wherein both the first and the second bits of the uplink transmission time interval index from the base station are used to select the early or the late transmission time interval for the user equipment to transmit the aperiodic data packet (designated 580 in FIG. 5B).

According to a sixth hybrid option, the aperiodic data packet including the channel quality indicator report is allocated in the late transmission time interval or subframe when uplink grant is given in a predefined frame structure (e.g., subframe #0 (or #5)). The aperiodic data packet including the channel quality indicator report is allocated in the early transmission time interval or subframe when uplink grant is given in accordance with another predefined frame structure (e.g., subframe #1 (or #6)). The hybrid option strikes a tradeoff among the aforementioned options, thereby producing a preferable situation (single user perspective) for allocations given the second downlink subframe although forcing the age of the channel quality indicator report to be more important compared to having an earlier availability of the channel quality indicator report. In the case of the DRX communication mode, however, this may not always be the case as discussed earlier. Thus, a network entity such as a base station allocates an uplink scheduling window as illustrated in FIGS. 5A and 5B using a hybrid approach in accordance with a predefined frame structure of the uplink grant or allocation (designated 590 in FIG. 5B).

Thus, as introduced hereinabove, a process is introduced advantageously to efficiently relieve the ambiguity for user equipment to transmit an aperiodic data packet including, without limitation, a channel quality indicator report to a base station employing efficient utilization of communication resources. At least one of the options listed above may be selected and specified in a communication standard such as 3GPP TS 36.213.

Figure 6:
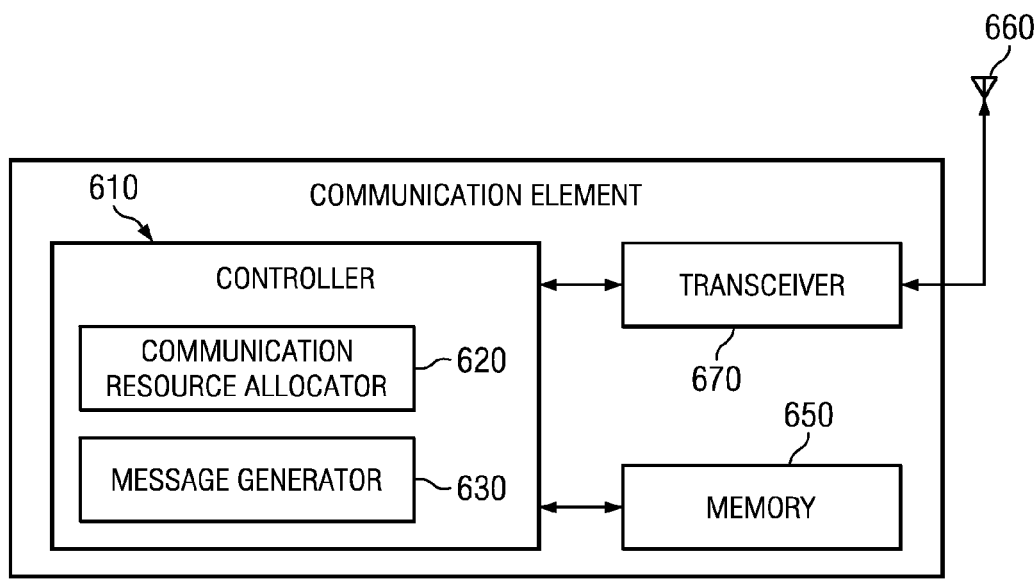
FIG. 6 illustrates a block diagram of an embodiment of a communication element of a communication system that provides an environment for application of the principles of the present invention.

Turning now to FIG. 6, illustrated is a block diagram of an embodiment of a communication element of a communication system that provides an environment for application of the principles of the present invention. The wireless communication system may include, for example, a cellular network. The communication element may represent, without limitation, a base station, a communication device (such as a wireless communication terminal, user equipment, and mobile station), a network control element, or the like.

The communication element includes a controller 610, memory 650 that stores programs and data of a temporary or more permanent nature, an antenna 660, and a radio frequency transceiver 670 coupled to the antenna 660 and to the controller 610 for bidirectional wireless communications. The communication element may provide point-to-point and/or point-to-multipoint communication services.

The communication element may be coupled to a communication network element, such as a network control element of a public switched telecommunication network. A network control element generally provides access to a core communication network such as a public switched telecommunication network ("PSTN"). Access to the communication network may be provided in fixed facilities, such as a base station, using fiber optic, coaxial, twisted pair, microwave communication, or similar link coupled to an appropriate link-terminating element (not shown). A communication element formed as a wireless communication device such as user equipment is generally a self-contained communication device intended to be carried by an end user.

The controller 610 in the communication element, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and equipment, configuration management, end user administration, management of subscriber stations, management of tariff, subscription, and security, and the like. The execution of all or portions of particular functions or processes related to management of resources may be performed in equipment separate from and/or coupled to the communication element, with the results of such functions or processes communicated for execution to the communication element. The controller 610 of the communication element may be of any type suitable to the local application environment, and may include one or more of general-purpose computers, special-purpose computers, microprocessors, digital signal processors ("DSPs"), and processors based on a multi-core processor architecture, as non-limiting examples.

In accordance with the memory 650, the controller 610 includes a communication resource allocator 620 configured to allocate a transmission time interval for transmission of an aperiodic data packet (e.g., with a channel quality indicator report) during one of a first transmission time interval (e.g., an early transmission time interval), a second transmission time interval (e.g., a late transmission time interval), and both the first and second transmission time intervals in an uplink scheduling window in response to a request for the aperiodic data packet by a network entity (e.g., a base station) and allocation of a plurality of uplink transmission time intervals in the scheduling window associated with the request by the network entity. The communication resource allocator 620 is configured to allocate one of the first transmission time interval and the second transmission time interval according first and second bits of an uplink transmission time interval index.

A message generator 630 of the controller 610 is configured to assemble a message including the aperiodic data packet for transmission to the network entity during one of the first transmission time interval, the second transmission time interval, and both the first and second transmission time intervals. The aperiodic data packet may include different channel quality indicator reports for transmission during the first and second transmission time intervals, wherein the different channel quality indictor reports include at least one of measurements on different frequency sub-bands or measurements made at different times. The aperiodic data packet may employ different modulation coding schemes for transmission during the first and second transmission time intervals. The aperiodic data packet is configured to be transmitted after a time for measuring, post-processing, coding, modulating and generating the aperiodic data packet. The controller 610 is operable according to an E-UTRAN standards and may include at least one chip with an integrated circuit. In performing the communication resource allocation as described herein, the communication resource allocator 620 and controller 610, in general, perform the functions as described herein as a part of a wireless communication device such as user equipment or other network entity.

The transceiver 670 of the communication element modulates information onto a carrier waveform for transmission by the communication element via the antenna 660 to another communication element. The transceiver 670 demodulates information received via the antenna 660 for further processing by other communication elements. The transceiver 670 is configured to transmit and receive the aperiodic data packet in cooperation with the controller 610.

The memory 650 of the communication element, as introduced above, may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 650 may include program instructions that, when executed by an associated processor, enable the communication element to perform tasks as described herein. Exemplary embodiments of the system, subsystems and modules as described herein may be implemented, at least in part, by computer software executable by processors of, for instance, the UE and the eNodeB, or by hardware, or by combinations thereof. As will become more apparent, systems, subsystems and modules may be embodied in the communication element as illustrated and described above.

In addition, program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM ("EROM"), a floppy diskette, a compact disk CD-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An apparatus comprising one or more processors, and one or more memories including computer program code, the one or more memories and the computer program code configured, with the one or more processors, to cause the apparatus to perform at least the following:

allocating one or more transmission time intervals for transmission of an aperiodic data packet including a channel quality indicator report during at least one of a first transmission time interval and a second transmission time interval in an uplink scheduling window, wherein the first and second transmission time intervals are determined in accordance with an uplink scheduling grant by a network entity; and assembling a message including said aperiodic data packet for transmission to said network entity during said at least one of said first transmission time interval and said second transmission time interval;

wherein said allocating comprises allocating said at least one of said first transmission time interval and said second transmission time interval for said aperiodic data packet in accordance with an uplink transmission time interval index in said uplink scheduling grant by a network entity; and wherein said uplink transmission time interval index comprises a most significant bit and a least significant bit.

2. The apparatus as recited in claim 1 further comprising a transceiver configured to receive said uplink scheduling grant from said network entity and transmit said aperiodic data packet to said network entity during said at least one of said first transmission time interval and said second transmission time interval.

3. The apparatus as recited in claim 1 further comprising a transceiver configured transmit said aperiodic data packet to said network entity during said at least one of said first transmission time interval and said second transmission time interval on a physical uplink shared channel.

4. The apparatus as recited in claim 1 wherein said allocating further comprises allocating said at least one of said first transmission time interval and said second transmission time interval for said aperiodic data packet employing one of different modulation coding schemes and different channel quality indicator reports.

5. The apparatus as recited in claim 4 wherein said different channel quality indicator reports include information selected from one of channel quality information on different frequency bands and channel quality information at different measurement times.

6. The apparatus as recited in claim 1 wherein said most significant bit and said least significant bit are set to 1 or 0 to allocate said at least one of said first transmission time interval and said second transmission time interval for said aperiodic data packet.

7. A non-transitory computer readable medium configured to:

allocate one or more transmission time intervals for an aperiodic data packet including a channel quality indicator report during at least one of a first transmission time interval and a second transmission time interval in an uplink scheduling window, wherein the first and second transmission time intervals are determined in accordance with an uplink scheduling grant by a network entity; and assemble a message including said aperiodic data packet for transmission to said network entity during said at least one of said first transmission time interval and said second transmission time interval;

wherein said allocate comprises allocating said at least one of said first transmission time interval and said second transmission time interval for said aperiodic data packet in accordance with an uplink transmission time interval index in said uplink scheduling grant by a network entity; and
    wherein said uplink transmission time interval index comprises a most significant bit and a least significant bit.

8. The non-transitory computer readable medium as recited in claim 7 wherein said most significant bit and said least significant bit are set to 1 or 0 to allocate said at least one of said first transmission time interval and said second transmission time interval for said aperiodic data packet.

9. A computer-executed method, comprising:
    allocating one or more transmission time intervals for an aperiodic data packet including a channel quality indicator report during at least one of a first transmission time interval and a second transmission time interval in an uplink scheduling window, wherein the first and second transmission time intervals are determined in accordance with an uplink scheduling grant by a network entity;
    assembling a message including said aperiodic data packet for transmission to said network entity during said at least one of said first transmission time interval and said second transmission time interval; and
    transmitting the assembled message;
    wherein said allocating comprises allocating said at least one of said first transmission time interval and said second transmission time interval for said aperiodic data packet in accordance with an uplink transmission time interval index in said uplink scheduling grant by a network entity; and
    wherein said uplink transmission time interval index comprises a most significant bit and a least significant bit.

10. The computer-executed method as recited in claim 9 wherein said most significant bit and said least significant bit are set to 1 or 0 to allocate said at least one of said first transmission time interval and said second transmission time interval for said aperiodic data packet.

11. The method as recited in claim 9, further comprising:
    receiving said uplink scheduling grant from said network entity; and
    transmitting said aperiodic data packet to said network entity during said at least one of said first transmission time interval and said second transmission time interval.

12. The method as recited in claim 9 wherein allocating comprises allocating said at least one of said first transmission time interval and said second transmission time interval for said aperiodic data packet employing one of different modulation coding schemes and different channel quality indicator reports.

13. An apparatus comprising one or more processors, and one or more memories including computer program code, the one or more memories and the computer program code configured, with the one or more processors, to cause the apparatus to perform at least the following:
    allocating one or more transmission time intervals for transmission of an aperiodic data packet including a channel quality indicator report during at least one of a first transmission time interval and a second transmission time interval in an uplink scheduling window, wherein the first and second transmission time intervals are determined in accordance with an uplink scheduling grant by a network entity; and
    assembling a message including said aperiodic data packet for transmission to said network entity during said at least one of said first transmission time interval and said second transmission time interval;
    wherein said allocating comprises allocating said at least one of said first transmission time interval and said second transmission time interval for said aperiodic data packet in accordance with an uplink transmission time interval index in said uplink scheduling grant by a network entity.

14. A non-transitory computer readable medium configured to:
    allocate one or more transmission time intervals for an aperiodic data packet including a channel quality indicator report during at least one of a first transmission time interval and a second transmission time interval in an uplink scheduling window, wherein the first and second transmission time intervals are determined in accordance with an uplink scheduling grant by a network entity; and
    assemble a message including said aperiodic data packet for transmission to said network entity during said at least one of said first transmission time interval and said second transmission time interval;
    wherein said allocate comprises allocating said at least one of said first transmission time interval and said second transmission time interval for said aperiodic data packet in accordance with an uplink transmission time interval index in said uplink scheduling grant by a network entity.

15. A computer-executed method, comprising:
    allocating one or more transmission time intervals for an aperiodic data packet including a channel quality indicator report during at least one of a first transmission time interval and a second transmission time interval in an uplink scheduling window, wherein the first and second transmission time intervals are determined in accordance with an uplink scheduling grant by a network entity;
    assembling a message including said aperiodic data packet for transmission to said network entity during said at least one of said first transmission time interval and said second transmission time interval; and
    transmitting the assembled message;
    wherein said allocating comprises allocating said at least one of said first transmission time interval and said second transmission time interval for said aperiodic data packet in accordance with an uplink transmission time interval index in said uplink scheduling grant by a network entity.

* * * * *